United States Patent
Zhao et al.

(10) Patent No.: US 8,059,768 B2
(45) Date of Patent: Nov. 15, 2011

(54) METHOD AND DEVICE FOR REMOVING NARROW BAND INTERFERENCE IN SPREADING FREQUENCY SYSTEM

(75) Inventors: Meng Zhao, Shenzhen (CN); Jiying Xiang, Shenzhen (CN); Chunbo Yao, Shenzhen (CN)

(73) Assignee: ZTE Corporation (CN)

( * ) Notice: Subject to any disclaimer, the term of this patent is extended or adjusted under 35 U.S.C. 154(b) by 681 days.

(21) Appl. No.: 12/096,160

(22) PCT Filed: Dec. 7, 2005

(86) PCT No.: PCT/CN2005/002115
§ 371 (c)(1),
(2), (4) Date: Jun. 4, 2008

(87) PCT Pub. No.: WO2007/065297
PCT Pub. Date: Jun. 14, 2007

(65) Prior Publication Data
US 2008/0304553 A1    Dec. 11, 2008

(51) Int. Cl.
*H03D 1/04* (2006.01)
(52) U.S. Cl. ........ 375/346; 375/144; 375/148; 375/350; 398/39; 455/114.2; 455/278.1; 455/296
(58) Field of Classification Search .................. None
See application file for complete search history.

(56) References Cited

U.S. PATENT DOCUMENTS

| | | | |
|---|---|---|---|
| 5,612,978 A * | 3/1997 | Blanchard et al. | 375/350 |
| 6,654,623 B1 * | 11/2003 | Kastle | 600/336 |
| 6,760,319 B1 | 7/2004 | Gerten et al. | |
| 6,868,114 B2 | 3/2005 | Bially et al. | |

FOREIGN PATENT DOCUMENTS

| | | |
|---|---|---|
| CN | 1592125 A | 3/2005 |
| EP | 1337050 | 8/2003 |
| WO | 2002/091610 | 11/2002 |
| WO | WO2005107088 | * 10/2005 |

OTHER PUBLICATIONS

European Patent Office "Supplementary European Search Report" for EP 05817884; dated Feb. 17, 2010; 2 pages. EP05817884 and U.S. Appl. No. 12/096,160 are both national-phase applications of PCT/CN2005/002115.

Vartiainen, J., et al; "Estimation of Signal Detection Threshold by CME Algorithms"; Vehicular Technology Conference, IEEE 59th Milan, Italy, May 17-19, 2004; IEEE vol. 3, pp. 1654-1658, Piscataway NJ, US; (3 pages).

An International Search Report from corresponding International Application No. PCT/CN2005/002115.

* cited by examiner

*Primary Examiner* — David C. Payne
*Assistant Examiner* — Adolf Dsouza
(74) *Attorney, Agent, or Firm* — Kolisch Hartwell, P.C.

(57) ABSTRACT

Narrow-band interference in spread spectrum systems is eliminated by performing a frequency spectrum transform on N sampling points of the data to obtain N points of data; after M transforms, getting an energy accumulation of individual data to obtain N energy values; removing partial excessive large values from the N energy values, averaging the rest, then calculating the threshold value for interference determination based on the average value; identifying all points that have energy values exceeding the threshold value, and performing interference suppression for the data of corresponding points after frequency spectrum transform and finally outputting the data after frequency spectrum inverse transform.

16 Claims, 2 Drawing Sheets

METHOD AND DEVICE FOR REMOVING NARROW BAND INTERFERENCE IN SPREADING FREQUENCY SYSTEM

TECHNICAL FIELD

The present invention pertains to spread spectrum technology used in a wireless communication system, specifically to a method and device for eliminating narrow-band interference.

TECHNOLOGY BACKGROUND

The spread spectrum communication system is widely used nowadays. The spread spectrum or the pseudo-random (PN) code modulation can decrease the interference from other users and wireless signals. During the cross-correlation process of received signals and PN sequence, when the interference is a narrow-band signal, the interference, signals will spread to the entire band and thus weaken the impact of the interference. As a result, the spread spectrum signals could weaken the narrow-band interference to some extend.

Figure 1:
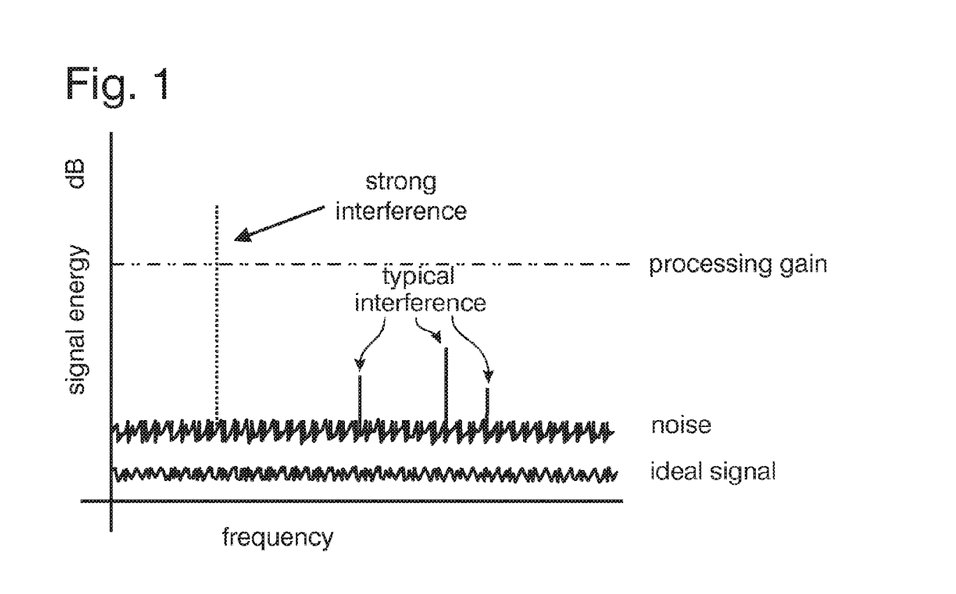
FIG. 1 is a schematic diagram of energy of frequency spectrum of general spread spectrum signals.

The typical spectrum of a spread spectrum signal (e.g. performing spread spectrum from PN sequence) is submerged in the noise, as shown in FIG. 1. Ideal signal is the signal energy that is actually sent out by the mobile station and noise is the additive interference. Obviously, the ideal signal energy of the spread spectrum is usually less than the noise energy. The "strong interference" generally refers to the blocking signals or the signals that are sent out by TV, wireless station and nearby communication equipments. "Typical interference" refers to the signals sent out by those low-power sources, such as amateur radio. Processing gain represents the level of the interference signals tolerable by the spread signals in mobile station. The spread signals can still be recovered when they are affected by the typical interference, but they will never be recovered when the strong interference shows up. What's more, even with the typical interference, the system performance will degrade thought the signals can be recovered.

Before utilizing CDMA communication system, the frequency band will be swept in order to protect the CDMA signals from the interference of narrow-band signals. However, since some burst signals are hard to be fully forbidden due to their burst characteristics, the narrow-band interference will present disorder and randomicity. The narrow-band interference will increase the congestion rate and call-dropping rate in a CDMA system, overload the radio-frequency power control system, increase the power consumption of mobile station and reduce the base station coverage. Under extreme situation, the high-power interference will even block the entire cell, and thus the normal communication will stop. As a result, a good solution have to be found in order to eliminate the impact of the narrow-band interference signals on the CDMA signals and guarantee good quality of the communication.

Generally, methods for dealing with narrow-band interference are divided into two categories:

The first category is to make the signal (usually under analog processing) pass through a narrow-band notch filter or filter group. This method is usually realized by the surface acoustic technology, in which the estimation for the frequency of interference signals is made and based on the estimation result, a narrow-band notch filter is placed where there are interference signals (the PLL (phase locked loop) can also be used to track the interference signals). However, the analog technology has its own limitations, and usually lacks flexibility.

Another kind of methods is frequency domain elimination which is generally realized through digital processing. Signals are first digitized and then transformed into frequency domain through Fourier Transform. These data will be processed in the frequency domain and finally be transformed back into the time domain to be output through inverse-Fourier Transform. The methods for processing interference signals in the frequency domain can be summarized into two types: the first one is to filter out the interference impact through the filter on the frequency domain data and this method is suitable when the bandwidth and location of the interference are already known, but this method will have a certain limitation when the interference location in the frequency domain, the bandwidth and the number of the interferences are hard to identify, since there is a certain degree of difficulty in designing a fully adaptive filter.

Another type is to compute the signal amplitude on each frequency point and then compares them with the threshold value. Signals exceeding the threshold values are considered as narrow-band interference signals and will be set as zero or be degraded to noise level. This method could adaptively process multiple interference, multiple interference bandwidths and interference frequency changes, but whether the threshold setting in this method is good or not will directly affect its performance. The common way of setting threshold is to calculate the average value of the energies or amplitudes of all the data that are transformed into frequency domain and multiply that average value with a fixed multiple, so the computed average value will be the main criteria in setting up the threshold. This method of setting threshold value will be subject to the impacts of the magnitude and the number of narrow-band interferences, because the obtained average value will have a corresponding increase when the energy and the number of the narrow-band interferences increase. Therefore it can not reflect the real performance of the energy of non-interference data and decrease the performance in interference suppression.

SUMMARY OF THE INVENTION

The technical problem that needs to be solved in present invention is to provide a method and device for eliminating narrow-band interference in a spread spectrum system, which could exactly distinguish interference data from non-interference data and thus effectively suppress narrow-band interference. The present invention also needs to provide a device that can realize the above method.

In order to solve the above technology problem, the present invention provides a method for eliminating narrow-band interference in a spread spectrum system, which comprises the following steps of:

(A) extracting N sampling points of data to perform frequency spectrum transform each time and obtaining the transformed N points of the data;

(B) for the N sampling points, getting the energy accumulation of individual data after transform for M times and obtaining N energy values, wherein M is the integer greater than or equal to 1;

(C) removing partial excessive large values from the N energy values and averaging the rest, then calculating a threshold value for interference determination based on the average value;

(D) comparing the N energy values with the threshold value, and obtaining identification information of all the points that have energy values exceeding the threshold;

(E) based on the identification information of said points, performing interference suppression for the data of the corresponding points after frequency spectrum transform and finally outputting the data after frequency spectrum inverse transform.

Moreover, the above method also possesses following features: in said step (C), it first sequences the N energy values and removes K largest energy values, wherein K is computed in one of the following methods:

$$K = \text{ceil}\left(\sum_{i=1}^{N_{li}} \frac{f_{li}}{f_s} * N\right), \quad a)$$

wherein $N_I$ is the estimated number of narrow-band interferences; $f_{li}$ is the estimated bandwidth of the $i^{th}$ narrow-band interference; $f_S$ is the sampling frequency of the input data. "ceil ( )" means rounding towards plus infinity.

b) K is the integer that is larger than 0.25N and less than 0.35N;

c) K is the number of the energy values that are larger than the threshold in said N energy values in the last computation;

d) K=N−1, means directly using the minimum energy value as said average value.

Additionally, the above method also possesses the following feature: in said step (C), it removes not only partial excessive large energy values, but also excessive small energy values as well, and then averages the rest.

Additionally, the above method also possesses the following feature: in said step (C), the average value is multiplied with 3-3.5 to be said threshold value.

Additionally, the above method also possesses the following features: in said step (B), M is determined by the number of sampling cycles included in an accumulation time period, and in step (E) when processing the interference elimination for the data in an accumulation time period, the points in which the interference suppression is needed to be performed are determined based on the identification information of the points with energy values larger than said threshold recorded in the last accumulation time period.

Additionally, the above method also possesses the following feature: the accumulation time period is of 60-120 ms. Additionally, the above method also possesses the following features: in step (E) when suppressing data interference, it is to reduce the energy values of the data at interference points to the time average value of the minimum energy value within said N energy values or it is to reduce the energy values of the data at interference points to the time average value of said average values.

The present invention provides a device for eliminating narrow-band interference in a spread spectrum system, and the device comprises a frequency spectrum transform unit, an interference elimination unit, an interference elimination control unit and a frequency spectrum inverse transform unit, wherein:

said frequency spectrum transform unit is used to perform frequency spectrum transform for the one-time-extracted N sampling points of the data and output the transformed data into the interference elimination unit and the interference elimination control unit;

said interference elimination unit is used to perform interference elimination processing for the data of the points based on the identification information of the points output from the interference elimination control unit and then the processed data will be sent to the frequency spectrum inverse transform unit;

said frequency spectrum inverse transform unit is used to perform frequency spectrum inverse transform for the data output from the interference elimination unit and then output them;

said interference elimination control unit is used to get the energy accumulation of individual data after transform for M times for the N sampling points and obtain N energy values, wherein $M \geq 1$, remove partial excessive large values and average the rest, compute the threshold value based on the average value and compare the threshold with the N energy values, then output the identification information of the points that have energy values exceeding the threshold value to the interference elimination unit.

Additionally, the above device also possesses the following characteristics: said interference elimination control unit further comprises an energy computation subunit, a data selection subunit, a threshold computation subunit and an interference determination subunit, wherein:

the energy computation subunit is used to compute the energy values of N points of the data after frequency spectrum transform and output the result to the interference determination subunit and the data selection subunit;

the data selection subunit is used to sequence the energy values of N points of the data, remove partial excessive large energy values and then output the energy values to the threshold computation subunit;

the threshold computation subunit is used to average the remaining energy values and calculate the threshold for interference determination based on the computed average value and then output the threshold value to the interference determination subunit;

the interference determination subunit is used to compare the N energy values with the threshold value, and then output the identification information of the points that have energy values exceeding the threshold value to the interference elimination unit.

Additionally, the above device also possesses the following characteristics: said interference elimination control unit further comprises an energy computation subunit, an energy accumulation subunit, a data selection subunit, a threshold computation subunit, an interference determination subunit and an interference record subunit, wherein:

said energy computation subunit is used to compute the energy values of N points of the data after frequency spectrum transform and output the result to the energy accumulation subunit;

said energy accumulation subunit is used to respectively accumulate the energy values of N sampling points of the data within a set accumulation time period to obtain N accumulated energy values and output the result to the data selection subunit and the interference determination subunit;

said data selection subunit is used to sequence the N accumulated energy values, remove partial excessive large energy values and then output the energy values to the threshold computation subunit;

said threshold computation subunit is used to average the remaining accumulated energy values, calculate the threshold for interference determination based on the computed average value and then output the threshold value to the interference determination subunit;

said interference determination subunit is used to compare the N accumulated energy values with the threshold value, and then output the identification information of the points that have energy values exceeding the threshold value to the interference record subunit;

said interference record subunit is used to record the point identification information output from the interference determination subunit and send the information to the interference elimination unit when the next accumulation time period starts;

moreover, said interference elimination unit performs interference elimination processing for the data of the corresponding points within the current accumulation time period based on the identification information of points output from the interference record subunit in the last accumulation time period.

Additionally, the above method also possesses the following features: the data selection subunit removes K largest energy values from said N energy values; K is pre-set in this subunit and can be obtained in the following method:

$$K = \text{ceil}\left(\sum_{i=1}^{N_{li}} \frac{f_{li}}{f_s} * N\right) \quad \text{a)}$$

wherein, $N_I$ is the estimated number of narrow-band interferences; $f_{Ii}$ is the estimated bandwidth of the $i^{th}$ narrow-band interference; $f_S$ is the sampling frequency of the input data, "ceil ( )" means rounding towards plus infinity;

b) K is the integer that is larger than 0.25N and less than 0.35N;

c) K is set as N−1, which means that the data selection subunit selects the minimum energy value for output.

Additionally, said device also comprises the following characteristics: said interference record subunit will also count the number K of points which have larger energy values than the threshold and send it to the data selection subunit, which will output the result after removing K largest energy values from said N energy values.

Additionally, said device also possesses the following characteristics: said data selection subunit removes not only partial excessive large energy values, but also excessive small energy values as well, and then outputs the remaining energy values.

Additionally, said device also possesses the following feature: in said threshold computation subunit, said average value is multiplied with 3-3.5 to be the threshold value.

Additionally, said device also possesses the following characteristics: when said interference elimination unit suppresses interference for data at interference points, it reduces the energy value of the data at interference points to the time average value of the minimum energy value within said N energy values, or it reduces the energy value of the data at interference points to the time average value of said average values.

The present invention aims at eliminating narrow-band interference in a spread spectrum communication system and processes the signals within the frequency domain. The designed interference determination threshold is used to sequence the estimated power spectrum or the frequency spectrum according to their energy or amplitude values, eliminate the impact of larger energy values. Therefore the obtained threshold will not change greatly due to the number and the amplitude of the narrow-band interferences, neither will it increase as the energy and the number of the narrow-band interferences increase. As a result, it could reflect the real performance of non-interference data and correctly distinguish the interference data from non-interference data without ignoring those original interference data, thus ensuring that the performance of suppressing interference remains stable when the interference situation changes.

PREFERRED EMBODIMENTS OF THE INVENTION

The present invention will be further described in detail with reference to the attached figures and the embodiments.

The First Embodiment

Figure 2:
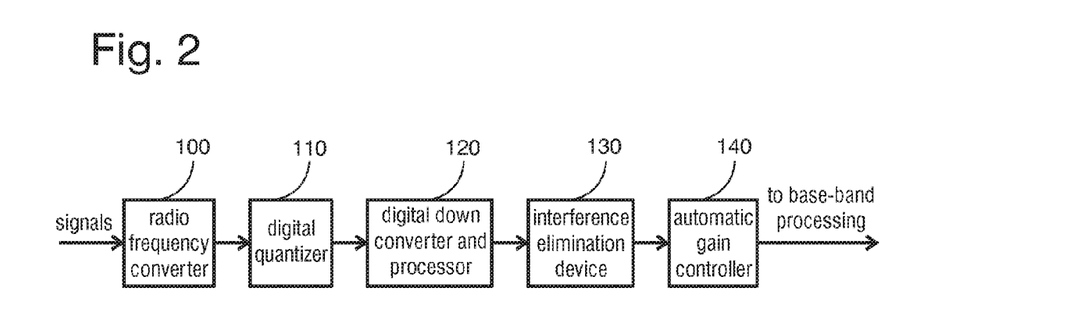
FIG. 2 is a schematic diagram of the structure of the received-signal-processing device in the first embodiment of the present invention.

FIG. 2 is a schematic diagram of the structure of the received-signal-processing device in the embodiment of the present invention, which comprises radio frequency converter 100, digital quantizer 110, digital down converter and processor 120, interference elimination device 130, and automatic gain processor 140.

The signals are received through the radio frequency converter 100 and converted into digital signals after being sampled through digital quantizer 110, then the signals are input into the digital down converter and processor 120 to be intermediate frequency (IF) signals. The output IF signals will be input into interference elimination device 130 for interference elimination processing and after the interference suppression, the data will be sent to automatic gain processor 140 for automatic gain control and finally be transmitted to the base-band for processing.

For the design of the location for interference elimination device 130, the device could either be placed before automatic gain controller 140 or at the place where the base-band processing is performed. In the present embodiment, it is chosen to be placed before automatic gain controller 140, because with the existence of the narrow-band interference, the signal energy will be much higher than the normal value, thus prohibiting the automatic gain controller 140 from performing gain control normally with respect to non-interference signals. When the interference is fairly high, the automatic gain controller 140 will be in saturated status and stop working. Therefore the selection of the location for interference elimination device 130 is an important factor in the design.

The above figure is only an example, and in fact other devices could also be added between individual devices.

Figure 3:
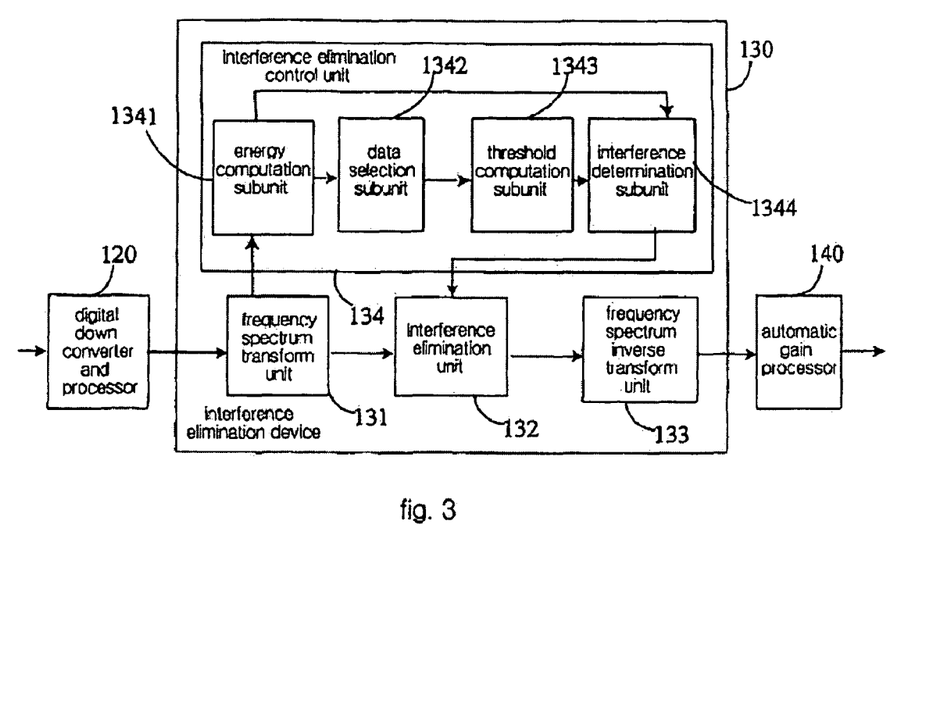
FIG. 3 is a schematic diagram of the structure of the interference elimination device in FIG. 2.

As shown in FIG. 3, interference elimination device 130 further comprises the following units:

a frequency spectrum transform unit 131 used to perform frequency spectrum transform for the one-time-extracted N sampling points of the data, obtain, the spectrum of the data and output the transformed data into the interference elimination unit and the interference elimination control unit;

an interference elimination unit 132 used to perform data interference suppression, and based on the received identification information of the points output from interference elimination control unit, degrade the energy values of these points to the noise level and send the N points of data after the interference elimination processing to frequency spectrum inverse transform unit;

a frequency spectrum inverse transform unit 133 used to perform frequency spectrum inverse transform for the N points of data output from the interference elimination unit and then output them;

an interference elimination unit 134 used to compute the data energy values that are received at N sampling points, remove K largest energy values and average the rest, compute the threshold based on the average value and compare the threshold with the N energy values, and then output the identification information of the points that have energy values exceeding the threshold value to the interference elimination unit.

The interference elimination control unit further comprises the following parts:

an energy computation subunit 1341 used to compute the energy values of N points of the data after frequency spectrum transform and output the result to the data selection subunit and the interference determination subunit;

a data selection subunit 1342 used to sequence the energy values of N points of the data, remove K largest energy values and output the remaining values to the threshold computation subunit;

a threshold computation subunit 1343 used to compute the average energy value for the remaining N-K energy values of the data and calculate the reasonable threshold for interference determination based on the computed average value, and then output the threshold value to the interference determination subunit;

an interference determination subunit 1344 used to compare the N energy values with the threshold value, and then identify those points that have larger energy values than the threshold values as the interference points, then finally output the identification information of those points to the interference elimination unit.

Based on said interference elimination device 130, in the present embodiment, the method for eliminating narrow-band interference in a spread spectrum system comprises following steps of:

step A, extracting the data of N sampling points to perform frequency spectrum transform each time and obtaining the transformed data of N points;

the present embodiment uses the FFT (Fast Fourier Transform) to obtain the estimation for data power spectrum. However there are other ways as well, such as cosine transform and wavelet transform, etc.

The chosen number N of the points is related to the minimum narrow-band interference bandwidth which can be identified. In the embodiment of the present invention, the bandwidth of the spread spectrum signal is 1.2288 MHz; the data sampling rate is 2*1.2288 MHz. In order to distinguish the narrow-band interference of 30 kHz, it needs at least 2*1.2288*10E6/(30*10$^3$)=81.92 points, namely FFT of 128 points. Obviously, the more points of FFT, the higher capability for distinguishing the narrow-band interference, which in return requires a greater amount of computation in hardware implementation, therefore, we can select the value of N based on the system and the requirements for the identification accuracy of narrow-band interference. In the present embodiment, N=256 can be chosen.

step B, computing the modulus square for the data of N points after transform, namely getting the energy values of the data to obtain the estimation value for the data power spectrum;

Step C, sequencing the energy values for the N points of the data, either in the order from small to large or from large to small, and then removing K largest energy values.

In the case of narrow-band interference elimination in a certain specific region, sometimes location and quantity of the interference can be determined according to the condition of the region, such as the characteristic of narrow-band signals obtained by frequency pre-sweeping. Then the number of the data occupied by the interferences can be computed according to the bandwidth and the number of the interferences, thus determining the number K of the points that needs to be removed and presetting it in the system. The calculation formula is as follows:

$$K = \text{ceil}\left(\sum_{i=1}^{N_{li}} \frac{f_{li}}{f_s} * N\right) \quad (1)$$

wherein $N_I$ is the number of narrow-band interferences; $f_{Ii}$ is bandwidth of the $i^{th}$ narrow-band interference; $f_S$ is sampling frequency of the input data, "ceil ( )" means rounding towards plus infinity.

In another embodiment, in order to simplify the design, the value of K in the system could be pre-set as the integer that is larger than 0.25N and less than 0.35N, for example, set as ceil ((⅓)*N). The reason for such setting is that while designing a narrow-band interference elimination system, if the entire bandwidth of the interference exceeds 30% of the signal bandwidth, the interference elimination system has already failed due to too much data interfered. Therefore, choosing this value based on the system design ability can ensure that the average value will not change due to the impact of the interference within the system capability scope, meanwhile can ensure the accuracy of the average value to a certain extent.

Step D, averaging the energy values for the remaining (N-K) points of data, and computing the threshold value for determining the narrow-band interference based the obtained average value.

It should be noted that the term "averaging" in the text is not limited to arithmetic mean, but it can also be weighted mean, geometric mean or middle value, etc.

When choosing the threshold, it needs to ensure that the data without interference will not be considered as interference, namely the threshold should not be too small; moreover, the data with interference should be guaranteed to be suppressed, namely the threshold should not be too large. Generally speaking, the CDMA signals could be approximated as white noise and its energy distribution is approximately $\chi'$ distribution, so a value that is 2-4 times, more preferably 3-3.5 times, of the average value can be taken as the threshold. However, the method of computing threshold value from an average value in the present invention is not limited to the method described above, any known algorithms can be used.

Step E, comparing the energy values of the N points of data with the threshold value, performing interference suppression for the points of data that have energy values exceeding the threshold, and degrading the energy value to the noise level;

Noise level is a statistic. The average value of the data during a certain time period could be treated as the estimation of the noise average. Without narrow-band interference, the data will generally satisfy the Gauss distribution, thus the estimation is unbiased. However, with the existence of the narrow-band interference, the data will no longer satisfy the Gauss distribution, therefore choosing the average value of all the data to be the "noise level" doesn't work properly. In the present embodiment, the minimum energy value of N data energy values is preferably chosen as the noise level standard. However, in another embodiment, the average value calculated from the steps above can also be chosen as the noise level standard, or the data energy values at interference points can also be degraded to zero. However, the original useful information is also removed totally, thus causing a great damage to the original data.

Step F, performing frequency spectrum inverse transform for the data after interference elimination processing and then outputting the data.

The Second Embodiment

The structure of received-signal-processing device in this embodiment is the same as in the first embodiment. However, when the interference elimination processing device in this example determined the location of the point with interference, it uses the energy value that is accumulated in an accumulation time period as the basis, and the information of these points is used for interference elimination in the next accumulation time period. By doing this, it could reduce the amount of the calculation as well as the requirements for real-time implementation of the hardware. Furthermore, while removing the K accumulated energy values in the present embodiment, the value of K is not pre-set, but is set based on the determination result from the last accumulation time period.

Figure 4:
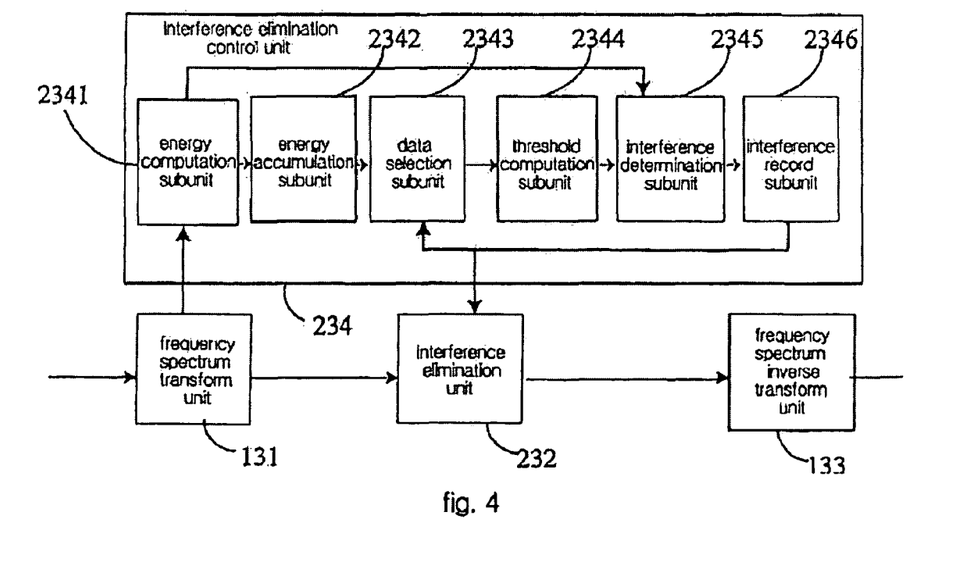
FIG. 4 is a schematic diagram of the structure of the interference elimination device in the second embodiment in the present invention.

FIG. 4 is a schematic diagram for the interference elimination device in the present embodiment, wherein the frequency spectrum transform unit 131 and the frequency spectrum inverse transform unit 133 are the same as in the first embodiment and will not be discussed anymore. While the interference elimination control unit 234 is used within an accumulation time period to respectively compute the accumulated energy values of N sampling points of the data, remove the K largest energy values and average the rest, determine a threshold based on the obtained average value and compare it with the N accumulated energy values, and then record the identification information of the points that have energy values exceeding the threshold value and finally output the information to the interference elimination unit 133. Based on the received identification information, the interference elimination unit will perform interference elimination processing for the corresponding points within the next accumulation time period.

As it is shown in FIG. 4, an energy accumulation subunit and an interference record subunit are added in the interference elimination control unit 234 which comprises in detail:

an energy computation subunit 2341 used to compute the energy values of N points of data after frequency spectrum transform and output the result to the energy accumulation subunit;

an energy accumulation subunit 2342 used to respectively accumulate the energy values for the data at N sampling points within a set accumulation time period and get the accumulated energy values of N points and output the values to the data selection subunit and interference determination subunit;

a data selection subunit 2343 used to sequence N accumulated energy values, remove the K largest energy values and output the values into threshold computation subunit. K is selected as the number of points that have energy values exceeding the threshold in the last accumulation time period according to the information output from the interference record subunit;

a threshold computation subunit 2344 used to compute the average value for the remaining N-K accumulated data energy values and calculate a reasonable threshold for interference determination based on the computed average value and then output the threshold value to the interference determination subunit;

an interference determination subunit 2345 used to compare the N accumulated energy values with the threshold value, and then identify those points that have larger energy values than the threshold values as the interference location points, finally output the identification information of those points to the interference record subunit;

an interference record subunit 2346 used to record the identification information of the interference points that is output from the interference determination subunit and send the result to the interference elimination unit when the next accumulation time period starts, and meanwhile count the number of the points and output the result to the data selection subunit.

Correspondingly, based on the identification information of the interference points that is output from the interference record subunit in the last accumulation time period, the interference elimination unit 232 is used to perform interference elimination processing for the data of corresponding points in the current accumulation time period, namely degrades its energy value to the noise level and finally outputs.

Correspondingly, there are some differences between the method of eliminating narrow-band interference in the spread spectrum system in this embodiment and that in the first embodiment, including the following steps:

Step 1, extracting data of N sampling points to perform frequency spectrum transform each time to obtain the transformed data of N points, and getting the energy values for the data after transform;

Meanwhile performing information update processing and interference elimination processing simultaneously, wherein the information update processing comprises following steps:

step 2, within a set accumulation time period, accumulating the data energy values for M times for the N sampling points of the data respectively and obtaining N accumulated energy values, wherein M is an integer which is greater than or equal to 1 and is determined by the number of sampling cycles included within a accumulation time period. When M=1, it means getting the energy values of the data for once;

Accumulation could make the estimated result closer to the real power spectrum, thus reflect more truthful characteristics of the data. The time duration of an accumulation time period should, on one hand, guarantee that the power spectrum obtained in the accumulation time period is stable, so the time duration should not be too short, and on the other hand, also guarantee that the characteristics of the narrow-band interference will not change dramatically within this time period and ensure that the estimated result of the power spectrum can reflect the changes of the narrow-band interference of spread spectrum signals in time. So the time duration should not be too long. Generally speaking, the time duration for narrow-band interference is measured in seconds, so the accumulation time period could be chosen as 60-120 ms, and this value will not greatly impact on the reaction capability of the system for the narrow-band interference.

step 3, sequencing N accumulated energy values and removing K largest energy values. K is selected as the number of points that have accumulated energy values exceeding the threshold in the last accumulation time period;

Here, K is determined by using priori information in the last accumulation time period. It could accurately avoid the impacts of the interference on the average value, thus ensuring that the threshold value will not change under the influence of interference.

step 4, computing the average energy value for the remaining N-K accumulated data energy values and calculating the threshold for interference determination based on the computed average value. Here, a value that is 3-3.5 times of the average value is also taken as the threshold value;

step 5, comparing the N accumulated energy values with the threshold value, and recording the identification information and number of the points that have accumulated energy values exceeding the threshold within the present accumulation time period and meanwhile removing the records of other points.

After step 1, the following steps for interference elimination processing are performed simultaneously:

step 2', for the N points of data that are obtained from frequency spectrum transform each time within the current accumulation time period, finding the points corresponding to the interferences that are recorded in the last accumulation time period and adjusting the energy values of the data at these points to the noise level;

The noise level in the present embodiment uses the minimum value of the N accumulated energy values divided by the accumulation times to be the noise level, namely, to degrade the energy value of the interference data to the minimum value after time averaging. Said average value that is calculated from previous steps can also be chosen to be divided by the accumulation times, namely after time averaging, to be the noise level.

step 3', performing frequency spectrum inverse transform for the adjusted data and outputting the result, ending.

Many variations and modification can be made based on said two embodiments above:

For example, in the two said embodiments, the average value is obtained by removing K points that have the largest energy values from the N points of data and averaging the rest, based on this average value the threshold is computed, thus avoiding the impacts on the threshold computation from interference signals with larger energies. Based on the above contents, another two embodiments with following changes can be obtained: after removing K points that have the largest energy values from the N points of data, then deleing L points that have the minimum energy values, and then averaging the remaining N-K-L energy values of the data, namely, selecting parts of the data in the middle positions after sequencing, while removing the excessively large and small data.

For another example, based on the device structures and method steps within the first and second embodiments, only the calculation method for the threshold value is modified and then another two embodiments can be obtained, in which after getting N energy values (accumulated or non-accumulated), the data selection subunit selects either the minimum energy value or an accumulated energy value which then multiplies with a coefficient to obtain a threshold value for interference determination, for example, the threshold value is 2-4 times, such as 3-3.5 times, of the minimum value. In such a way, the impacts on the threshold computation from excessive large energy values produced by interference can also be avoided.

In summary, as regards eliminating narrow-band interference in the spread spectrum communication system, the present invention processes the signals within the frequency domain. For the designed threshold for interference determination, it is to sequence the estimated spectrum of the data according to their energy values (namely the squares of the amplitudes) and exclude the impacts of excessively large energy values on threshold computation. Therefore, the obtained threshold value will not vary greatly under the influence of the magnitude and the number of narrow-band interferences, neither will it increase when the energy and the quantity of the narrow-band interference increase. Therefore it can reflect the real level of non-interference data, as well as accurately distinguish between the interference and non-interference data. Meanwhile, it will never lead to the ignorance of the data that is originally interference, thus ensuring that the performance of the interference suppression can be still stable even when the interference situation changes.

INDUSTRIAL APPLICABILITY

The present invention has already been realized in the CDMA_20001x backward link. After the simulation, with the existence of both large energy narrow-band interference and multiple narrow-band interferences, it greatly increases the suppression capability of the interference suppression system and improves the system performance. The present invention is a general technology, and can be used for obtaining threshold value in the technology for eliminating narrow-band interference in any spread spectrum system.

What we claimed is:

1. A method for eliminating narrow-band interference in a spread spectrum system, comprising the following steps of:
    (A) extracting data of N sampling points to perform frequency spectrum transform each time and obtaining transformed data of N points;
    (B) for the N sampling points, getting an energy accumulation of individual data after transform for M times and obtaining N energy values, wherein M is an integer greater than or equal to 1;
    (C) removing partial excessive large values from said N energy values and averaging remaining energy values to get an average value, calculating a threshold value for interference determination based on the average value;
    (D) comparing said N energy values with the threshold value, and obtaining identification information of all points that have energy values exceeding the threshold value;
    (E) based on the identification information of said points, performing interference suppression for the data of corresponding points after frequency spectrum transform, performing frequency spectrum inverse transform for processed data and then outputting;
    wherein step (C) is first to sequence said N energy values and remove K largest energy values, and K is computed in one of following methods:

$$K = \operatorname{ceil}\left(\sum_{i=1}^{N_{Ii}} \frac{f_{Ii}}{f_S} * N\right) \quad \text{a)}$$

wherein, $N_I$ is estimated number of narrow-band interference; $f_{Ii}$ is estimated bandwidth of $i^{th}$ narrow-band interference; $f_S$ is sampling frequency of input data, "ceil ( )" means rounding towards plus infinity;

b) K is an integer that is larger than 0.25N and less than 0.35N;

c) K is a number of values that are larger than the threshold value in the N energy values in last computation;

d) K=N−1, i.e., directly using minimum energy value as said average value.

2. The method in claim 1, wherein said step (C) removes not only partial excessive large energy values, but also excessive small energy values as well, and then averages the remaining energy values.

3. The method in claim 1, wherein said step (C) uses said average value multiplied with 3-3.5 to be said threshold value.

4. The method in claim 1, wherein in said step (B), M is determined by a number of sampling cycles included in an accumulation time period, and in said step (E) when processing interference elimination for data in an accumulation time period, the points in which the interference suppression is needed to be performed are determined based on the identification information of the points whose energy values are larger than said threshold recorded in a last accumulation time period.

5. The method in claim 1, wherein said accumulation time period is of 60-120 ms.

6. The method in claim 1, wherein in step (E) when performing interference suppression for the data, energy values of data at interference points are reduced to time average value of the minimum energy value within said N energy values, or the energy values of data at interference points are reduced to time average value of said average value.

7. A device for eliminating narrow-band interference in a spread spectrum system, characterized in that it comprises a frequency spectrum transform unit, an interference elimination unit, an interference elimination control unit and a frequency spectrum inverse transform unit, wherein:

said frequency spectrum transform unit is used to perform frequency spectrum transform for one-time-extracted N sampling points of data and output transformed data to the interference elimination unit and the interference elimination control unit;

said interference elimination unit is used to perform interference elimination processing on data of points based on identification information of these points output from the interference elimination control unit and then send processed data to the frequency spectrum inverse transform unit;

said frequency spectrum inverse transform unit is used to perform frequency spectrum inverse transform for the data output from the interference elimination unit and then output them;

said interference elimination control unit is used to get an energy accumulation of individual data after transform for M times for the N sampling points to obtain N energy values (M≧1), remove K excessive large values and average remaining energy values to get an average value, compute a threshold value based on the average value and compare the threshold value with the N energy values, and then output the identification information of the points that have energy values exceeding the threshold value to the interference elimination unit;

wherein K is computed in one of following methods:

$$K = \text{ceil}\left(\sum_{i=1}^{N_{Ii}} \frac{f_{Ii}}{f_s} * N\right) \quad \text{a)}$$

wherein, $N_I$ is estimated number of narrow-band interference; $f_{Ii}$ is estimated bandwidth of $i^{th}$ narrow-band interferences; $f_S$ is sampling frequency of input data, "ceil ( )" means rounding towards plus infinity;

b) K is an integer that is larger than 0.25N and less than 0.35N;

c) K is a number of values that are larger than the threshold value in the N energy values in last computation;

d) K=N−1, i.e., directly using minimum energy value as said average value.

8. The device for eliminating narrow-band interference in claim 7, characterized in that the interference elimination control unit further comprises an energy computation subunit, a data selection subunit, a threshold computation subunit and an interference determination subunit, wherein:

the energy computation subunit is used to compute energy values of N points of data after frequency spectrum transform and output the energy values to the interference determination subunit and the data selection subunit;

the data selection subunit is used to sequence the energy values of N points of data, remove K excessive large energy values and then output to the threshold computation subunit;

the threshold computation subunit is used to average the remaining energy values to obtain an average value and calculate a threshold value for interference determination based on the obtained average value and then output the threshold value to the interference determination subunit;

the interference determination subunit is used to compare the energy values of N points of data with the threshold value, and then output the identification information of the points that have energy values exceeding the threshold value to the interference elimination unit.

9. The device in claim 8, characterized in that said interference record subunit will also count a number of points, K, which have larger energy values than the threshold value, and output the number to the data selection subunit, wherein said data selection subunit removes K largest energy values from said N energy values and then output.

10. The device in claim 8, wherein said data selection subunit removes not only partial excessive large energy values, but also excessive small energy values, and then outputs the remaining energy values.

11. The device in claim 8, wherein said threshold computation subunit uses said average value multiplied with 3-3.5 as the threshold value.

12. The device for eliminating narrow-band interference in claim 7, characterized in that said interference elimination control unit further comprises an energy computation subunit, an energy accumulation subunit, a data selection subunit, a threshold computation subunit, an interference determination subunit and an interference record subunit, wherein:

said energy computation subunit is used to compute the energy values of N points of data after frequency spectrum transform and output the energy values to the energy accumulation subunit;

said energy accumulation subunit is used to respectively accumulate the energy values of N sampling points of data within a set accumulation time period and obtain N accumulated energy values and output them to the data selection subunit and the interference determination subunit;

said data selection subunit is used to sequence the N accumulated energy values, remove K excessive large energy values and then send the energy values to the threshold computation subunit;

said threshold computation subunit is used to average the remaining accumulated energy values to obtain an average value and calculate a threshold value for interference determination based on the obtained average value and then output the threshold value to the interference determination subunit;

said interference determination subunit is used to compare the N accumulated energy values with the threshold value, and then output the identification information of the points that have energy values exceeding the threshold value to the interference record subunit;

said interference record subunit is used to record the identification information of the points output from the interference determination subunit and output the information to the interference elimination unit when next accumulation time period starts;

Moreover, said interference elimination unit performs interference elimination processing for the data of corresponding points within current accumulation time period based on the identification information of the points output from the interference record subunit in last accumulation time period.

13. The device in claim 12, characterized in that said interference record subunit will also count a number of points, K, which have larger energy values than the threshold value, and output the number to the data selection subunit, wherein said data selection subunit removes K largest energy values from said N energy values and then output.

14. The device in claim 12, wherein said data selection subunit removes not only partial excessive large energy values, but also excessive small energy values, and then outputs the remaining energy values.

15. The device in claim 12, wherein said threshold computation subunit uses said average value multiplied with 3-3.5 as be the threshold value.

16. The device for eliminating narrow-band interference in claim 7, wherein when said interference elimination unit suppresses interference for data at interference points, it reduces the energy values of the data at interference points to time average value of minimum energy value in said N energy values or it reduces the energy values of the data at interference points to time average value of said average values.

* * * * *